United States Patent [19]

Higginbottom

[11] 4,011,186

[45] Mar. 8, 1977

[54] AQUEOUS RESOLE RESIN SOLUTIONS HAVING DISPERSED INERT SALTS

[75] Inventor: Harold P. Higginbottom, Wilbraham, Mass.

[73] Assignee: Monsanto Company, St. Louis, Mo.

[22] Filed: Feb. 18, 1976

[21] Appl. No.: 658,945

[52] U.S. Cl. ............................. 260/29.3; 428/430
[51] Int. Cl.² ...................................... C08G 51/24
[58] Field of Search ............... 260/29.3, 57 C, 59 R

[56] References Cited

UNITED STATES PATENTS

| | | | |
|---|---|---|---|
| 2,348,244 | 5/1944 | Dearing | 260/29.4 R X |
| 3,300,427 | 1/1967 | Hebert | 260/29.3 |
| 3,432,453 | 3/1969 | Gladney et al. | 260/29.3 |
| 3,624,247 | 11/1971 | Gladney | 260/29.3 |

*Primary Examiner*—Theodore E. Pertilla
*Attorney, Agent, or Firm*—Joseph S. Nelson; William J. Farrington; James C. Logomasini

[57] ABSTRACT

This invention relates to resoles catalyzed with alkaline earth metal hydroxides and neutralized with oxalic acid or its acid salts providing inert insoluble oxalate salts dispersed in said resoles. Said salts are size controlled and stabilized in aqueous resole resin solution having about 40 to 95 percent resole resin by weight. A method for manufacture is disclosed.

20 Claims, No Drawings

AQUEOUS RESOLE RESIN SOLUTIONS HAVING DISPERSED INERT SALTS

BACKGROUND OF THE INVENTION

During the normal manufacture of single stage resole-type liquid phenolic resins a basic catalyst is utilized. To stabilize the finished resin, the base is usually neutralized at the end of the manufacturing process. The neutralization results in the formation of either a soluble or insoluble salt depending on the base catalyst and neutralizing acid employed. Since the presence of excess salt can be deleterious to certain end use properties, it is often removed from the resin by techniques such as insoluble salt filtration or ion exchange. From both a cost and pollution criteria, it is desirable to avoid removing the salt from the resin. Thus, a need exists in the art for aqueous resole resin solutions that have been neutralized so as to provide particular inert salts that do not need to be removed but enhance the properties of the aqueous resole resin solutions.

FIELD OF THE INVENTION

In the present invention resole resins are formed using bases containing polyvalent cations such as calcium and barium. The cation is converted to a highly insoluble oxalate salt at the end of the manufacturing process. The cation so inerted does not interfere with key application properties of the resole resin.

The calcium or barium oxalate is formed in situ in the resin as very fine insoluble particles which results in very stable dispersions with no tendency to settle or coagulate. The highly insoluble nature of these salts make them, in principle, a highly inert dispersed filler with little tendency to adversely affect key properties, e.g. moisture resistance. Because the dispersions are colloidal, in nature, the resins can be pumped, sprayed and generally handled like salt free resins.

The combination of the fine particle calcium or barium oxalate dispersion with a phenolic resole resin produces an unexpected enhancement in the viscosity of the system. This enhancement in viscosity can be an advantage in many applications. For example, the pick up and retention of resin on substrates is increased as viscosity increases. The use of the dispersed salt gives an alternative to viscosity control which is normally controlled by varying the molecular weight and solids content of the resin itself.

The objective of the present invention is to provide a resole solution having particular dispersed inert salts that do not degrade the physical properties of the resole but enhance their properties.

Also, it is the objective of the present invention to disclose a method for preparing said resole solutions having particular, stable, dispersed inert salts.

SUMMARY OF THE INVENTION

The above described needs of the art are fulfilled by the present invention:

An aqueous solution of a resole resin having a pH of 3 to 8.5 comprising:

a. said resole resin having a number average molecular weight is less than about 300, a water tolerance greater than 50 percent, a combined formaldehyde to phenol ratio in the range of from about 1.0:1 to 2.9:1 and, b. a dispersion of insoluble oxalate salt particles, wherein, said resole being prepared with a catalyst comprising alkaline earth metal hydroxides selected from the group consisting of magnesium, calcium, barium, strontium and mixtures thereof, said pH being adjusted with a compound selected from the group consisting of oxalic acid, ammonium oxalate and mixtures thereof providing a stable dispersion of insoluble oxalate salt particles of said alkaline earth metal ions in said solution, wherein said solution is stable to salt flocculation at a resole resin content of from about 40 to 95 percent by weight.

Another aspect of the invention is directed to a process for preparing the stable aqueous resole solutions having dispersed inert salts which comprises:

a. reacting 1.0 mole of phenol with from about 1.0 to 3.5 moles of formaldehyde under basic conditions so as to produce a resole resin in aqueous solution having a number average molecular weight in the range of from about 150 to 300, said basic conditions being provided by a alkaline earth hydroxide catalyst selected from the group consisting of magnesium, calcium, barium, strontium and mixtures thereof, b. adjusting the pH of said solution to about 3 and 8.5 with a compound selected from the group consisting of oxalic acid, ammonium oxalate and mixtures thereof, c. producing a stable dispersion of insoluble particles of oxalate salts of said alkaline earth metal ions in said solution, and d. adjusting the water content of said aqueous resole resin solution so as to have present from about 40 to 95 percent by weight of said resole resin.

PREFERRED EMBODIMENTS

Aqueous resole resin solutions containing dispersed oxalate salts are basically resole resins prepared using calcium or barium hydroxide and neutralized with oxalic acid or ammonium oxalate.

The base catalyzed reaction from 1.0 to 4.0 moles of formaldehyde with one mole of phenol is carried out in the presence of calcium or barium hydroxide. Additional bases such as sodium hydroxide or organic amines may be added as cocatalysts and pH regulators for the resin system. Typically, between 0.02 and 0.30 mole equivalents of total base per mole of original phenol are utilized. The reaction is carried out at a temperature range of from 40° to 80° C.

The resole reaction is preferably carried out with aqueous formalin solution of between 30–70 percent formaldehyde with completed reaction solids adjusted to 40–95 percent by vacuum stripping to remove water or by addition of water.

Aqueous resoles containing dispersed salts can be used in presence of variety of formaldehyde scavengers and resole co-reactants. Suitable formaldehyde scavengers and resole coreactants include nitrogen containing organic compounds soluble in the resole, of molecular weight less than 300, containing at least one NH group per molecule reactive with formaldehyde. Examples include ammonia, primary and secondary amines, urea, substituted ureas, primary amides, dicyandiamide, guanidines and aminotriazines such as melamine, guanamine and benzoguanamine. Depending on the advancement of the resole it may be preferably to add the scavengers and resole coreactants just prior to end use to avoid storage stability problems such as rapid loss of resole water tolerance or the precipitation of resin components. Alternatively, the formaldehyde scavenging reaction is carried out at the end of the resole reaction, prior to neutralization with oxalate, preferably at a temperature in the range of 20° to 60° C., to minimize oligomerization of the resole. The amount of coreactant added can vary within very wide limits up to 1.0 mole per mole of phenol in the original reaction mixture. It is preferred to use between 0.5 and 1.5 mole equivalents of scavenger per mole of free formaldehyde present at the end of the resole reaction.

The preferred catalyst for resole stage is barium or calcium hydroxide. Supplementary bases which can be used with the main catalyst include alkali metal hydroxides such as lithium hydroxide, sodium hydroxide and potassium hydroxide, alkali metal carbonates such as sodium carbonate and potassium carbonate, aqueous ammonia and amines of molecular weight less than 300. The process can be carried out wherein said catalyst comprises said alkaline earth hydroxides used in combination with a compound selected from the group consisting of lithium hydroxide, sodium hydroxides, potassium hydroxide, sodium carbonate, potassium carbonate, organic amines, aqueous ammonia and mixtures thereof wherein about 0.02 to 0.30 mole equivalents of combined catalyst are used per mole of phenol charged, said alkaline earth catalysts constituting about 50 to 95 percent of the mole equivalents provided by said combined catalyst.

At the end of the reaction the barium and calcium hydroxides are neutralized with sufficient oxalate to yield a highly insoluble dispersed salt and adjust the pH within the range of 3.0 to 8.5. The supplementary bases are partially neutralized as necessary and function to control the resin pH between 3 and 8.5. Preferably, the pH is adjusted between 6.0 and 8.0.

The formation of the insoluble oxalate can conveniently be done by adding solid oxalic acid, (usually oxalic acid dihydrate) ammonium oxalate or water solutions of these to the resole system. Factors such as agitation and temperature are important in obtaining a fine particle dispersion. Neutralization is carried out in the range of 25° to 75° C. preferably 30°-60° C. wherein precipitation of the inert salts occur. Generally, the higher the temperature the finer the precipitated particle. Agitation should be consistent with the mixing required for a given vessel and known engineering practices for stirred tanks. Generally, the higher the agitation the smaller the particle size and can be adjusted to an intensity consistent with the particles size required by simple experimentation for a specific stirred tank.

The oxalate salt formed in water dispersion are characterized by excellent stability with regard to sedimentation and shear. Particle size is extremely small being $2\mu$ and normally averaging from about 0.01 to $1.0\mu$, preferably 0.02 to $0.8\mu$.

The inert salts unexpectedly do not flocculate or precipitate and are stable in water solutions of the resole resins of this invention if the resole resin content is from about 40 to 95 percent by weight. If the solutions are diluted to lower than about 40 percent solids then flocculation and precipitation of the salts can occur. Hence, although the resole resins as resins are highly dilutable, and have a water tolerance greater than 500 percent the aqueous resole solutions containing the inert salts are not since the inert salts will flocculate in solutions containing less than about 40 percent by weight of resole resin solids. The resole resin solutions having dispersed inert salts can be made dilutable by the addition of an anionic dispersing agent to inhibit the flocculation of the salts as disclosed in copending application (Ser. No. 658,988 filed Feb. 18, 1976) filed of an event date in the name of Harold P. Higginbottom.

The aqueous resole resin solutions having dispersed inert salts have great utility in bonding substrates wherein heavy loadings of resole resin is desired for bonding purposes. Such aqueous resole resin can be prepared for fabricators having a high resole resin content. Anionic dispersing agents may then be added by the fabricator so that the inert salts are stabilized and do not flocculate when diluted to lower resole resin contents as used in many bonding operations. Economics are realized and pollution problems realized by the use of the aqueous resole solutions of the present invention.

The following examples will further illustrate the present invention, however, it is to be understood that the scope of the invention is not limited by the examples.

EXAMPLE 1

A base catalyzed aqueous resole resin solution is prepared by reacting 3.05 mole of aqueous formaldehyde (50 percent) per one mole of phenol in the presence of 0.035 mole of sodium hydroxide and .032 mole of calcium hydroxide initially below 60° C. to control reaction exotherm. The reaction is then conducted at 60°-70° C. range until the unreacted formaldehyde content drops to 7.5 percent. The reaction is cooled to 40° C. and 0.033 mole of oxalic acid dihydrate is added rapidly with agitation. The resin is filtered through a 100 micron filter to remove any coarse impurities. The resulting dispersion is stable to storage at 0°-10° C. with no bottom settling. The product has a Brookfield viscosity of 235 cps. Other resin properties are summarized in Table I. Dispersion stability is summarized in Table II. Moisture sensitivity tests are summarized in Table III.

EXAMPLE 2

Example 1 is repeated except after reaching the 7.5 percent formaldehyde level the reaction is cooled to 50° C. At 50° C 3 grams of Orzan A* are added for each mole of phenol originally charged. After the Orzan dissolves, the mixture is cooled to 40° C. and neutralized with 0.033 mole of oxalic acid dihydrate with agitation. The resulting dispersion is filtered through a 100 micron filter and is stable to any bottom settling. Dispersion stability on dilution is summarized in Table II. Resin properties are summarized in Table I.
*Orzan A is a commercial ammonia lignosulfonate available from Crown Zellerbach Corporation, New York, N.Y.

EXAMPLE 3

Example 1 is repeated except the final resin is centrifuged to remove the dispersed calcium oxalate salt. The resulting resin has a Brookfield viscosity of 20 cps. Other resin properties are summarized in Table I. Moisture sensitivity tests are summarized in Table III.

EXAMPLE 4

Example 1 is repeated except the resin is neutralized at 40° C. with 0.066 moles of acetic acid. The resulting clear resin has a Brookfield viscosity of 25 cps. Other resin properties are summarized in Table I. Moisture sensitivity tests are summarized in Table III.

EXAMPLE 5

Example 1 is repeated except 0.032 moles of barium monohydrate is added in place of calcium hydroxide. The completed reaction is cooled to 40° C. and 3 parts of Daxad 11* are added and dissolved with agitation and 0.034 mole of oxalic acid dihydrate is added and dissolved. The resulting cloudy solution is stable to storage at 0°–10° C. with no bottom settling. Resin properties are summarized in Table I. Dispersion stability is summarized in Table II.

* Daxad 11 is a commercial sulfonated naphthalene formaldehyde dispersing agent available from Dewey and Almy Division, W. R. Grace & Company, New York, N. Y.

EXAMPLE 6

A base catalyzed resole resin solution is prepared by reacting 2.9 mole of aqueous formaldehyde (50 percent) per 1 mole of phenol in the presence of 0.023 mole of sodium hydroxide and 0.044 mole of calcium hydroxide, initially below 60° C. to control reaction exotherm. The reaction is then conducted at 60°–70° C. range until the unreacted formaldehyde content drops to 7.9 percent. Reaction is cooled to 55° C. and dicyandiamide (0.17 mole) and melamine (0.04 mole) are added and reacted 20 minutes. Urea (0.63 mole) is charged and dissolved. Reaction is cooled to 40° C. and 3 parts of Toranil B* is charged and dissolved. With agitation, 0.048 mole of oxalic acid dihydrate is added. Properties of the resulting dispersion are summarized in Table I. Dispersion stability is summarized in Table II.

*Toranil B is commercial calcium lignosulfonate available from St. Regis Paper Company, New York, N. Y.

EXAMPLE 7

A base catalyzed resole resin solution is prepared by reacting 3.05 mole of aqueous formaldehyde (50 percent) per 1 mole of phenol in the presence of 0.035 mole of sodium hydroxide and 0.032 mole of calcium hydroxide initially below 60° C. to control reaction exotherm. The reaction is then conducted at 60°–70° C. range until the unreacted formaldehyde content drops to 8.0 percent. The reaction is cooled to 50° C. and 0.74 mole of urea is charged and reacted one-half hour. Orzan AL-50* (6 parts per 1 mole of phenol) is added and reaction cooled to 30° C. and 0.033 mole of oxalic acid dihydrate is added rapidly with agitation. The resulting dispersion does not settle on storage. Dispersion stability is summarized in Table II. Resin properties are summarized in Table I.

*Orzan Al-50 is a commercial 50 percent aqueous solution of an ammonia lignosulfonate available from Crown Zellerbach Corporation, New York, N. Y.

EXAMPLE 8

A base catalyzed aqueous resole resin solution is prepared by reacting 1.57 mole of aqueous formaldehyde (50 percent) per 1 mole of phenol in the presence of 0.035 mole of sodium hydroxide and 0.032 mole of calcium hyroxide, initially below 60° C. to control reaction exotherm. The reaction is then conducted at 60°–70° C. range until the unreacted formaldehye conducted at 60°–70° C. range until the unreacted formaldehyde content drops below 0.5 percent. The reaction is cooled to 40° C. and 0.033 mole of oxalic acid is added with agitation. The resulting resin has a viscosity of 450 cps which drops to 25 cps when the calcium oxalate dispersion is removed by centrifuging. Resin properties are summarized in Table I. Dispersion stability if summarized in Table II.

EXAMPLE 9

Example 8 is repeated except after neutralization 6 parts of a 50 percent solution of Daxad 11 is added to each 100 parts of resin. Resin properties are summarized in Table I. Diluted dispersion stability is summarized in Table II.

EXAMPLE 10

A base catalyzed aqueous resole resin solution is prepared by reacting 3.05 mole of aqueous formaldehyde (50 percent) per 1 mole of phenol in the presence of 0.051 mole of calcium hydroxide, initially below 60° C. to control reaction exotherm. The reaction is then conducted at 60°–70° C. range until the unreacted formaldehyde content drops to 7.8 percent. The reaction is cooled to 50° C. and 3 parts of Orzan A per 1 mole of phenol originally charged is dissolved. Oxalic acid dihydrate (0.049 mole) is then added rapidly with agitation. The resin is filtered through a 100 micron filter to remove any coarse impurities. The resulting dispersion is stable to storage at 0°–10° C. with no bottom settling. Resin properties are summarized in Table I. Dispersion stability is summarized in Table II. This resin has a pH of 3.2 but displays excellent dispersed salt stability and resin stability.

EXAMPLE 11

A base catalyzed resole resin is prepared by reacting 2.54 mole of aqueous formaldehyde (50 percent) per 1 mole of phenol in the presence of 0.035 mole of sodium hydroxide and 0.14 mole of calcium hydroxide, initially below 60° C. to control reaction exotherm. The reaction is then conducted at 70° C. reflux until the unreacted formaldehyde content drops to 2.3 percent. The reaction is then cooled to 50° C. and 0.14 mole of oxalic acid is added rapidly with agitation. The viscous dispersion (Brookfied viscosity 3800 cps) is stable to storage at 0°–10° C. with no bottom settling. The resin centrifuged to remove the dispersed salt has a Brookfield viscosity of 25 cps. Resin properties are summarized in Table I. Dispersion stability is summarized in Table II.

EXAMPLE 12

A dispersed salt resin prepared as described in Example 11 is formulated with 15 parts of Orzan AL-50 for each 100 parts of resin 11. Resin properties are summarized in Table I. Dispersion stability is summarized in Table II.

TESTS

Dilute Dispersion Stability Test

In order to test the stability of the dispersed salt to flocculation and settling when diluted, the following test is employed. A 100 gm. sample of dispersed salt resin is charged to a 2 liter mixing vessel equipped with a 2 inch diameter 3-blade stirrer. The pH of the resin is adjusted to the 8.0 to 8.5 range with aqueous ammonia. The stirrer is then set at 200 rpm while sufficient water is added slowly to dilute the resin solids content to approxiately 5 percent. A 100cc charge of the diluted dispersion is placed in a conical tip centrifuge tube graduated to 0.05cc. The tube is supported in a vertical position for 24 hours. A sample is considered to have excellent dispersed salt stability if after 24 hours no resin precipitation is observable and the maximum sedimate is less than 0.10cc. All of the dispersed salt resins made according to Examples 1–12 had good dispersed salt stability undiluted. Only those containing added dispersing agents were stable to dilution with water as exemplified by Example 1 vs. 2, Example 8 vs. 9, Example 11 vs. 12 in Table II.

clearly removed by centrifuging. Example 4 has the calcium in the form of soluble calcium acetate.

Resin films are cast on precleaned microscope slides by preheating the slides on the surface of a hot plate at 100° C. A few drops of the resin as made are placed on the heated slide and a thin uniform film is developed by applying pressure with a spatula and spreading resin on slide as volatiles are lost. After about 5 minutes the

TABLE I

COMPARISON OF RESOLE PROPERTIES - EXAMPLES 1 – 12

| | 1 | 2 | 3 | 4 | 5 | 6 | 7 | 8 | 9 | 10 | 11 | 12 |
|---|---|---|---|---|---|---|---|---|---|---|---|---|
| pH | 7.95 | 7.54 | 7.85 | 7.85 | 7.7 | 6.8 | 7.85 | 8.30 | 8.1 | 3.20 | 7.35 | 4.20 |
| Owens Solids | 48.2 | 49.3 | 47.6 | 48.6 | 49.9 | 52.3 | 53.9 | 55.2 | 54.1 | 50.5 | 52.8 | 53.5 |
| Brookfield visc. cps | 235 | 69 | 20 | 25 | 65 | 175 | 150 | 450 | 410 | 130 | 3800 | 1750 |
| Water Tolerance % | >6000 | >6000 | >6000 | >6000 | >6000 | 800 | >6000 | >6000 | >6000 | 2900 | 500 | 500 |
| Ash % | 1.24 | 1.34 | 0.59 | 1.19 | 2.2 | 1.6 | 1.20 | 1.4 | 1.4 | 1.17 | 3.4 | 4.4 |
| % F[1] | 7.3 | 7.4 | 7.3 | 7.3 | 7.4 | 0.5 | 1.32 | 0.46 | 0.40 | 7.50 | 1.6 | 1.4 |
| Combined F/P | 2.15 | 2.18 | 2.15 | 2.14 | 2.19 | 2.19 | 2.25 | 1.50 | 1.50 | 2.39 | 2.32 | 2.32 |
| $M_n$[2] | 191 | 193 | 191 | 190 | 190 | 205 | 198 | 157 | 157 | 196 | 248 | 248 |
| n[3] | 1.23 | 1.21 | 1.23 | 1.22 | 1.21 | 1.28 | 1.26 | 1.15 | 1.15 | 1.20 | 1.58 | 1.58 |

[1]Formaldehyde
[2]Number average molecular weight
[3]Average number of aromatic rings per molecule

TABLE II

COMPARISON OF DISPERSION STABILITY

| | | Dilute Dispersion Test | |
|---|---|---|---|
| Example | Undiluted* | Initial Appearance | 24 Hour Appearance |
| 1 | Good | Flocculation occurs rapidly | Total flocculation 4 cc sedimate |
| 2 | Good | Excellent Dispersion No flocculation | 0.04 cc |
| 5 | Good | Excellent Dispersion No flocculation | 0.06 cc |
| 6 | Good | Excellent Dispersion No flocculation | 0.03 cc |
| 7 | Good | Excellent Dispersion No flocculation | 0.05 cc |
| 8 | Good | Flocculation occurs rapidly | Total flocculation 3.8 cc sedimate |
| 9 | Good | Excellent Dispersion No flocculation | 0.05 cc |
| 10 | Good | Excellent Dispersion No flocculation | 0.03 |
| 11 | Good | Flocculation occurs rapidly | Total flocculation 10 cc sedimate |
| 12 | Good | Excellent Dispersion No flocculation | 0.09 |

*Resins as made and undiluted. Good stability indicates no bottom settling of particles when stored 1 month at 0–5° C.

TABLE III

MOISTURE SENSITIVITY EVALUATION

| Resin Type | 8 Hour soak* | 24 Hour soak* | 32 Hour soak* | 48 Hour soak* |
|---|---|---|---|---|
| Example 1 % | 0 | 0 | 0 | 95 |
| Example 3 % | 0 | 20 | 98 | 100 |
| Example 4 % | 95 | 100 | 100 | 100 |

*Water soak at 25° C.

Moisture Sensitivity Test

The desirable effect of the calcium oxalate salt on reducing moisture sensitivity of cured resin films is demonstratable by the following test. Resins made according to procedures of Examples 1, 3 and 4 are compared. The phenolic portion of each resin is essentially the same and each resin has an equivalent sodium ion content. Example 1 contains the stable dispersion of calcium oxalate. Example 3 has the stable dispersion resin coated slide is removed from the hot plate and placed in a curing oven for 15 minutes at 177° C. The cured slides are then soaked in water at 25° C., and the percent resin film separation from the glass slides after 8, 24, 32 and 48 hours is measured. The results are tabulated in Table III.

The resin of Example 1 can be treated with 0.1 percent A-1102 silane on a solids base. Slides prepared as described above with silane modified Example 1 will stand a 3 hour immersion in boiling water with no separation of film.

The properties of the resoles are tabulated in Table I. The properties are measured directly on neutralized resin unless indicated otherwise. The values for the mole ratio of formaldehyde combined with phenol (combined F/P), degree of polymerization and number average molecular weight ($M_n$) are determined by nuclear magnetic resonance procedures as described in J. Polym. Sci. A-1,3, 1079 (1965). The percent formaldehyde measurements on the reaction mixtures and final products are determined by the hydroxylamine hydrochloride test.

Water tolerance is determined at 25° C. by addition of water to the clear centrifuged resole until a slight permanent haze forms. The tolerance is the weight of water expressed as a percent by weight of the resin solids. Thus, where the haze point occurs when 80 parts by weight of water impart haze to 20 parts by weight of resole resin solids, the tolerance is 400 percent. The resoles of the present invention are found to have water tolerances generally greater than 500 percent. A water tolerance above 6000 percent is regarded as being infinitely dilutable.

EXAMPLE 13

Evaluation of Thermal Insulation Resins

Thermal insulation is prepared by applying the phenolic resin system of the present invention to a matrix of mineral fiber. The preferred fiber is glass. For example, the phenolic resin system is diluted with water to form a solution or dispersion containing between 2 and 25 percent solids. The aqueous dispersion or solution is applied to a matrix of glass fibers in an amount sufficient to yield a matrix containing from about 2 to about 15 percent by weight of cured resin. The matrix is subjected to drying conditions by forcing a volume of air heated at 100° F. through the matrix for a period of three minutes. The dried matrix is placed in a mold and cured for two minutes at 400° F. In another method of preparing thermal insulation, the diluted solution or dispersion is sprayed onto glass fibers immediately after the fibers have been formed and while they are falling through the air onto a conveyor to form a mat. The mat is then advanced on the conveyor compressed against another conveyor to the required density and is heated to a temperature in the range of 400°–500° F.

The resins of the present invention have outstanding application characteristics and are equivalent to conventional salt free resoles. For example, the dispersed salt resin prepared by Example 2 is compared with the corresponding salt free version of Example 3 when sprayed onto glass fibers to form thermal insulation. Both resins are formulated with 10 parts of 26° Be ammonia, 1 part of ammonium sulfate and 0.05 part of A1102 silane for each 100 parts of liquid resin. The resins are formulated and diluted to 10 percent solids by the addition of water with sufficient agitation to permit effective blending. The diluted mixes are both stable to settling and can be pumped and sprayed under pressure using hydraulic and pneumatic spray nozzles. The diluted dispersion formed from Example 2 type resin has no tendency to plug pumps, filter screens or nozzles. Insulation made from Example 2 and Example 3 mixes are equivalent in appearance and properties.

The binder compositions of this invention can be formulated with silanes and lubricants to gain property benefits well known in the art

What is claimed is:

1. An aqueous solution of a resole resin having a pH of 3 to 8.5 comprising:
   a. said resole resin having a number average molecular weight is less than about 300, a water tolerance greater than 50 percent, a combined formaldehyde to phenol ratio in the range of from about 1.0:1 to 2.9:1 and,
   b. a dispersion of insoluble oxalate salt particles, wherein, said resole being prepared with a catalyst comprising alkaline earth metal hydroxides selected from the group consisting of magnesium, calcium, barium, strontium and mixtures thereof, said pH being adjusted with a compound selected from the group consisting of oxalic acid, ammonium oxalate and mixtures thereof providing a stable dispersion of insoluble oxalate salt particles of said alkaline earth metal ions in said solution, wherein said solution is stable to salt flocculation at a resole resin content of from about 40 to 95 percent by weight.

2. An aqueous solution of claim 1, wherein said resole resin is present in amounts of from about 40 to 95 percent by weight based on said aqueous solution.

3. An aqueous solution of claim 1, having present a formaldehyde scavenger selected from the group consisting of ammonia, primary and secondary amines, urea, substituted ureas, primary amides, dicyandiamide, guanidines, aminotriazines and mixtures thereof.

4. An aqueous solution of claim 3, wherein said formaldehyde scavenger is present in amounts of from about 0.5 to 1.5 mole equivalents per mole of free formaldehyde in said aqueous solution.

5. An aqueous solution of claim 1, wherein said dispersed oxalate salt particles have an average particle size of less than $2\mu$.

6. An aqueous solution of claim 1, wherein said dispersed oxalate salt particles have an average particle size ranging from about 0.02 to $0.8\mu$.

7. An aqueous solution of claim 1, wherein said pH range is 6 to 8.5, the resole resin having an average molecular weight of from about 150 to 300, a water tolerance greater than 50 percent, a combined formaldehyde to phenol ratio of from about 1.0:1 to 2.9:1, wherein the inert oxalate salt is calcium or barium oxalate and wherein said resole resin is present in from about 40 to 95 percent by weight of said solution.

8. A process for preparing stable aqueous resole resin solutions having dispersed inert salts which comprises:
   a. reacting 1.0 mole of phenol with from about 1.0 to 3.5 moles of formaldehyde under basic conditions so as to produce a resole resin in aqueous solution having a number average molecular weight in the range of from about 150 to 300, said basic conditions being provided by a alkaline earth hydroxide catalyst selected from the group consisting of magnesium, calcium, barium, strontium and mixtures thereof,
   b. adjusting the pH of said solution to about 3 and 8.5 with a compound selected from the group consisting of oxalic acid, ammonium oxalate and mixtures thereof,
   c. producing a stable dispersion of insoluble particles of oxalate salts of said alkaline earth metal ion in said solution, and
   d. adjusting the water content of said aqueous resole resin solution so as to have present from about 40 to 95 percent by weight of said resole resin.

9. A process of claim 8, wherein said reacting of step (a) is carried out at temperatures of from 40° to 80° C.

10. A process of claim 8, wherein said basic conditions are provided by from about 0.02 to 0.30 mole equivalents of said catalyst per mole of phenol.

11. A process of claim 8, wherein said catalyst comprises said alkalines earth hydroxides used in combination with a compound selected from the group consisting of lithium hydroxide, sodium hydroxide, potassium hydroxide, sodium carbonate, potassium carbonate, organic amines, aqueous ammonia and mixtures thereof wherein about 0.02 to 0.30 mole equivalents of combined catalyst are used per mole of phenol charged, said alkaline earth catalysts constituting about 50 to 95 percent of the mole equivalents provided by said combined catalyst.

12. A process of claim 8, wherein said formaldehyde is an aqueous formaline solution containing from about 30 to 70 percent formaldehyde.

13. A process of claim 8, wherein the percent by weight of the resole resin is said aqueous solution is determined by the vacuum stripping of water formed in step (d) in amounts sufficient to provide the percent by weight of resole resin desired.

14. A process of claim 8, wherein the percent by weight of the resole resin in said aqueous solution is determined by the addition of water in step (d) in amounts sufficient to provide the percent by weight desired.

15. A process of claim 8, wherein a formaldehyde scavenger is added at the end of step (a) and reacted with the free aldehyde in said aqueous solution at temperatures ranging from about 20° to 60° C.

16. A process of claim 15, wherein said scavenger is added in amounts of from about 0.5 to 1.5 mole equivalents per mole of free formaldehyde in said aqueous solution.

17. A process of claim 8, wherein step (b) is carried out with sufficient agitation to produce dispersed inert salts having an average particle size of less than 2μ.

18. A process of claim 8, wherein step (b) is carried out at temperatures of from about 25° to 75° C.

19. A process of claim 8, wherein step (d) is carried out after step (a) and followed by step (b).

20. A process of claim 19, wherein step (d) is carried out by the vacuum stripping of the water in amounts of sufficient to provide the percent by weight of resole resin desired.

* * * * *